United States Patent
Heap et al.

(10) Patent No.: US 8,924,108 B2
(45) Date of Patent: Dec. 30, 2014

(54) METHOD OF MANAGING AVAILABLE OPERATING STATES IN AN ELECTRIC VEHICLE POWERTRAIN

(71) Applicant: GM Global Technology Operations LLC, Detroit, MI (US)

(72) Inventors: Anthony H. Heap, Ann Arbor, MI (US); Kee Yong Kim, Ann Arbor, MI (US); Samantha Victoria Lado, Pittsfield Township, MI (US); John Janczak, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 29 days.

(21) Appl. No.: 13/871,122

(22) Filed: Apr. 26, 2013

(65) Prior Publication Data

US 2014/0324306 A1    Oct. 30, 2014

(51) Int. Cl.
*G06F 7/00* (2006.01)
*F16H 61/68* (2006.01)

(52) U.S. Cl.
CPC .............. *F16H 61/68* (2013.01); *Y10S 477/906* (2013.01)
USPC .............. 701/58; 477/3; 477/4; 477/5; 477/6; 477/906

(58) Field of Classification Search
CPC ..... B60W 20/00; B60W 20/10; B60W 20/30; B60W 20/50; B60W 50/0205; B60W 2050/021; B60W 2050/0292
See application file for complete search history.

(56) References Cited

U.S. PATENT DOCUMENTS

| | | | |
|---|---|---|---|
| 2008/0262684 A1 * | 10/2008 | Taffin et al. | 701/57 |
| 2009/0043467 A1 * | 2/2009 | Filev et al. | 701/57 |
| 2009/0118918 A1 * | 5/2009 | Heap et al. | 701/54 |

* cited by examiner

*Primary Examiner* — David D Le
(74) *Attorney, Agent, or Firm* — Quinn Law Group, PLLC

(57) ABSTRACT

A method of managing available operating states in an electrified powertrain includes: identifying a plurality of operating states; determining an allowable hardware operating speed range for each of the plurality of operating states; determining a real operating speed range for each of the plurality of operating states; determining an ideal operating speed range for each of the plurality of operating states, the ideal operating speed range being a subset of the allowable real operating speed range; indicating an operating state of the plurality of operating states as ideal-allowed if an actual output speed of the electrified powertrain is within the ideal operating speed range for that operating state; and commanding the electrified powertrain to operate within one of the operating states that is indicated as ideal-allowed.

11 Claims, 4 Drawing Sheets

METHOD OF MANAGING AVAILABLE OPERATING STATES IN AN ELECTRIC VEHICLE POWERTRAIN

TECHNICAL FIELD

The present invention relates to a method of managing operating states in an electrified vehicle powertrain.

BACKGROUND

Motorized vehicles include a powertrain operable to propel the vehicle and power the onboard vehicle electronics. The powertrain, or drivetrain, generally includes an engine that powers a final drive system through a multi-speed transmission. In some vehicles, the engine is a reciprocating-piston type internal combustion engine. The transmission may be supplied with transmission fluid or transmission oil to lubricate the components therein.

Hybrid vehicles utilize multiple, alternative power sources to propel the vehicle, minimizing reliance on the engine for power. A hybrid electric vehicle (HEV), for example, incorporates both electrical energy and chemical energy, and converts the same into mechanical power to propel the vehicle and power any of the vehicle's systems. The HEV generally employs one or more electric machines (motor/generators) that operate individually or in concert with the internal combustion engine to propel the vehicle. An electric vehicle (EV) also includes one or more electric machines and energy storage devices used to propel the vehicle.

The electric machines convert kinetic energy into electrical energy, which may be stored in an energy storage device. The electrical energy from the energy storage device may then be converted back into kinetic energy for propulsion of the vehicle, or may be used to power electronics, auxiliary devices, or other components.

SUMMARY

A method of managing available operating states in an electrified powertrain begins by first identifying a plurality of operating states of the electrified powertrain, where each operating state represents a distinct physical configuration of the electrified powertrain. The electrified powertrain is configured to operate in a manner that rotatably drives a vehicle wheel at a rotational output speed. Following this, the method includes determining an allowable hardware operating speed range for each of the plurality of operating states, with the allowable hardware operating speed range being defined by a first hardware limit and a second hardware limit. Additionally, a controller may determine a real operating speed range for each of the plurality of operating states, with the real operating speed range being a subset of the allowable hardware operating speed range, and being defined by a first real limit that is greater than the first hardware limit, and by a second real limit that is less than the second hardware limit. An ideal operating speed range may then be determined for each of the plurality of operating states, where the ideal operating speed range is a subset of the allowable real operating speed range, and is defined by a first ideal limit that is greater than the first real limit, and by a second ideal limit that is less than the second real limit.

Once the ranges are determined, the method may include indicating an operating state of the plurality of operating states as "ideal-allowed" if an actual output speed of the electrified powertrain is within the ideal operating speed range for that operating state; and commanding the electrified powertrain to operate within one of the operating states that is indicated as ideal-allowed.

The above features and advantages and other features and advantages of the present invention are readily apparent from the following detailed description of the best modes for carrying out the invention when taken in connection with the accompanying drawings.

DETAILED DESCRIPTION

Figure 1:
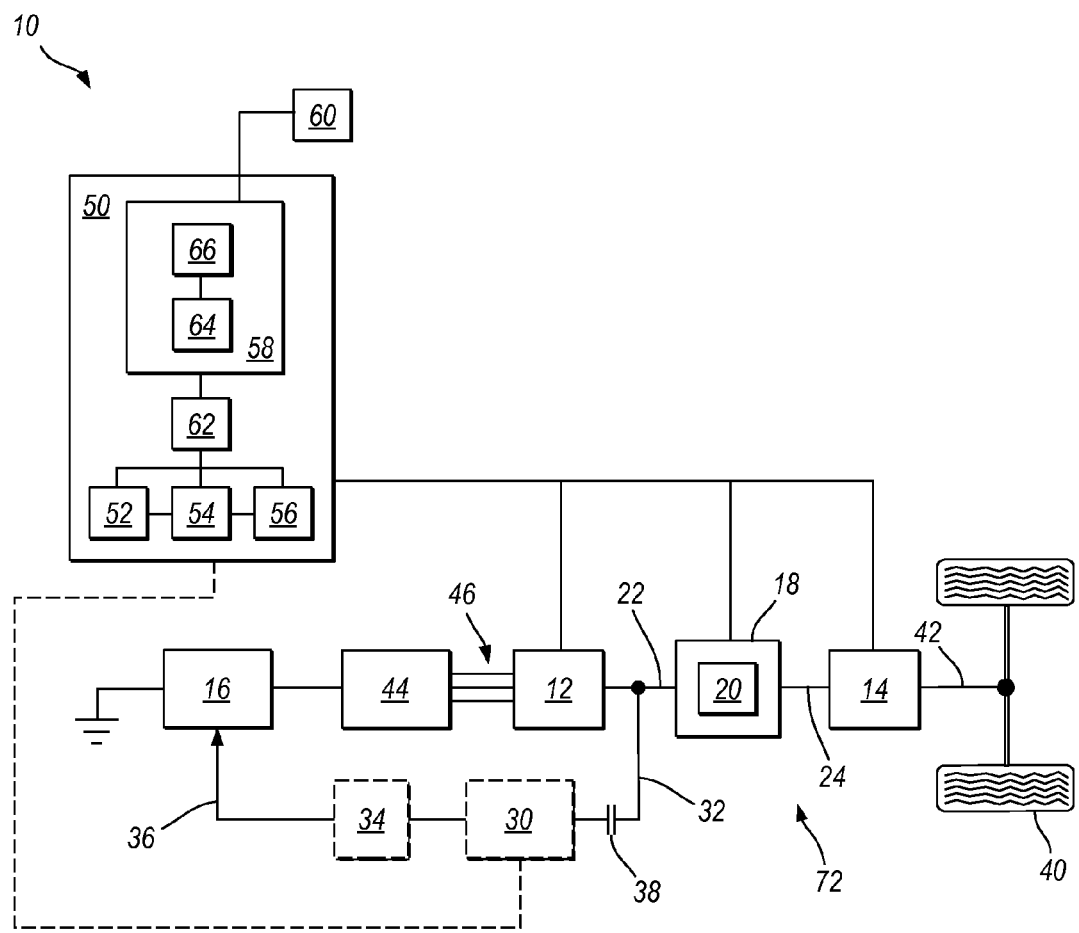
FIG. 1 is a schematic diagram of a hybrid electric vehicle powertrain.

Referring to the drawings, wherein like reference numerals are used to identify like or identical components in the various views, FIG. 1 schematically illustrates an electric vehicle powertrain 10. In one configuration, the vehicle powertrain 10 may include a first traction motor 12, a second traction motor 14, and an energy storage system 16 (e.g., a battery 16). As such, the vehicle powertrain 10 may be configured as a hybrid electric vehicle powertrain (HEV), a battery electric vehicle powertrain (BEV), or an extended-range electric vehicle powertrain (EREV). Such vehicles can generate torque using one or both of the traction motors 12, 14 at levels suitable for propelling the vehicle in an electric-only (EV) mode.

In one configuration, the first and second traction motors 12, 14 may be in mechanical communication through a transmission 18. The transmission 18 may include a plurality of rotating gears, clutches, and or other components (i.e., torque transmitting devices 20) that may selectively couple, either alone or in combination, a transmission input shaft 22 with a transmission output shaft 24.

In one configuration, the transmission input shaft 22 may be selectively coupled with the first traction motor 12, and the transmission output shaft 24 may be selectively coupled with the second traction motor 14. In one configuration, the selective coupling may be accomplished through one or more friction clutches, torque converters, or other coupling devices that may be integral with the shafts 22, 24, to allow each motor 12, 14 to transmit/receive torque at the command of a transmission control module.

The transmission 18 may be, for example, an electrically-variable transmission (EVT), such that the input characteristics of the input shaft 22 and the output characteristics of the output shaft 24 need not have fixed ratios of the input shaft 22 via continuously variable speed ratios. For example, in some embodiments, the output speed at the output shaft 24 may be positive even though the input speed at the input shaft 22 may be zero.

The torque transmitting devices (collectively shown at 20) may be selectively engageable within the transmission 18 to establish different forward and reverse speed ratios or operating modes between the input shaft 22 and output shaft 24. Shifting from one speed ratio or mode to another may occur in response to vehicle conditions and operator (driver) demands. The speed ratio is generally defined as the input speed divided by the output speed of the transmission 18. Thus, a low gear range has a high speed ratio, and a high gear range has a relatively lower speed ratio.

Electrically-variable transmissions, including the transmission 18, may be designed to operate in both fixed-gear (FG) modes and EVT modes. Because electrically-variable transmissions are not limited to single-speed gear ratios, the different operating states may be referred to as ranges or modes instead of gears. When operating in a fixed-gear mode, the rotational speed of the output shaft 24 of the transmission 18 is a fixed ratio of the rotational speed of the input shaft 22. Electrically-variable transmissions are also configured for operation that is mechanically independent from the final drive, thereby enabling high-torque continuously-variable speed ratios, electrically dominated launches, regenerative braking, and engine-off idling and launches.

In some designs, an internal combustion engine 30, shown in phantom in FIG. 1, may be used to generate torque via an engine output shaft 32. Torque from the engine output shaft 32 can be used to either directly propel the vehicle powertrain 10, i.e., in an HEV design, or to power a generator 34, i.e., in an EREV design. The generator 34 can deliver electricity (arrow 36) to the battery 16 in a manner that may recharge the battery 16. A clutch and damping assembly 38 may be used to selectively connect/disconnect the engine 30 from a transmission 18. Torque may be ultimately transmitted from the first and/or second traction motors 12, 14, and/or the engine 30 to a set of drive wheels 40 via an output 42 of the second traction motor 14 (and/or the transmission 18 if the second motor 14 is omitted).

Each traction motor 12, 14 may be embodied as a multi-phase permanent magnet/AC induction machine rated for approximately 60 volts to approximately 300 volts or more depending on the vehicle design. Each fraction motor 12, 14 may be electrically connected to the battery 16 via a power inverter module (PIM) 44 and a high-voltage bus bar 46 (it should be noted that the schematic depiction of the high voltage bus bar extending to the second traction motor 14 has been omitted from FIG. 1 for clarity). The PIM 44 may generally be configured for converting DC power to AC power and vice versa as needed. The battery 16 may be selectively recharged using torque from the first traction motor 12 when that traction motor 12 is actively operating as generator, e.g., by capturing energy during a regenerative braking event or when being driven by the internal combustion engine 30. In some embodiments, such as plug-in HEV (PHEV), the battery 16 can be recharged via an off-board power supply (not shown) when the vehicle powertrain 10 is idle.

Both traction motors 12, 14, the transmission 18, and the engine 30 may be in electronic communication with a controller 50. In one configuration, the controller 50 may include, for example, an engine control module 52 (ECM 52) for controlling the operation of the engine 30, a hybrid control module 54 (HCM 54) for controlling the operation of the traction motors 12, 14, and/or a transmission control module 56 (TCM 56) for controlling the operation of the transmission 18. The controller 50 may be embodied as one or multiple digital computers or data processing devices, having one or more microcontrollers or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, input/output (I/O) circuitry, and/or signal conditioning and buffering electronics.

The ECM 52, HCM 54, and TCM 56 may be embodied as software or hardware and may or may not be physically separated from each other. In one configuration, the modules 52, 54, 56 may be compartmentalized functions executed by the same physical structures of the controller 50. In another configuration, each module 52, 54, 56 may be relegated to its own hardware computing device. Regardless, every module 52, 54, 56 may be in digital communication with the other modules 52, 54, 56 to coordinate the overall behavior of the vehicle powertrain 10 Each module 52, 54, 56 may be configured to automatically perform one or more control/processing routines that may be embodied as software or firmware associated with the module 52, 54, 56. It should be noted that this specific configuration of the "modules" is described as such for clarity. In practice, however, any specific function described as within one of the modules may be executed by another module, or alternatively, all of the functions may simply be executed by the controller 50 without separate identification of the modules.

In general the various hardware components described above may be selectively engageable with adjacent components to form a torque transmitting path from one or more torque sources (i.e., traction motors 12, 14, and engine 30) to the vehicle drive wheels 40. Each combination of engaged/disengaged components, operational/non-operational torque sources, and torque generating/torque consuming modes (i.e., for motors 12, 14) may be characterized generally as an "operating state."

In one configuration, the controller 50 may further include a state management module 58 (SMM 58), which may be resident within any of the ECM 52, HCM 54, and TCM 56, or may be a separate as generally shown. The SMM 58 may receive a torque request from a user (such as from an accelerator pedal 60), and determine the best operating state to achieve the desired torque request. The SMM 58 may choose the operating state in a predictive manner that forecasts an acceleration/deceleration trend, while also preventing operation of the electric vehicle powertrain 10 in a manner that may compromise the integrity or longevity of the various motor or transmission components described above.

Each operating state may have a corresponding hardware limit for various parameters such as speed, torque, and temperature. If the powertrain, in a particular state, is operated beyond of the hardware limit, one or more components within the system may be at a drastically increased likelihood of failing (i.e., losing its ability to transmit torque from a torque source to the vehicle wheels). In general, the hardware limit may be a function of physical factors, such as individual component design, construction, lubrication, and/or arrangement.

To guard against a hardware limit being inadvertently crossed, the controller 50 may include a speed request limiter 62 that may alter the behavior of the powertrain 10 and/or the amount of torque generated/consumed within the powertrain 10 if a hardware limit is being approached. The speed request limiter 62 may generally operate in software by saturating a requested amount of torque prior to transmitting the request to the ECM/HCM. In this manner, the performance and/or responsiveness of the vehicle will be noticeably affected if a hardware limit is being approached and the speed request limiter 62 must intervene.

The SMM 58 may include an optimization routine 64 and an available state identifier 66. The optimization routine 64 may receive the torque request from the user and select the optimal operating state from the available operating states that may achieve the desired response. The list of available operating states may be generated by the available state identifier 66, and may be made available to the optimization routine 64.

Figure 2:
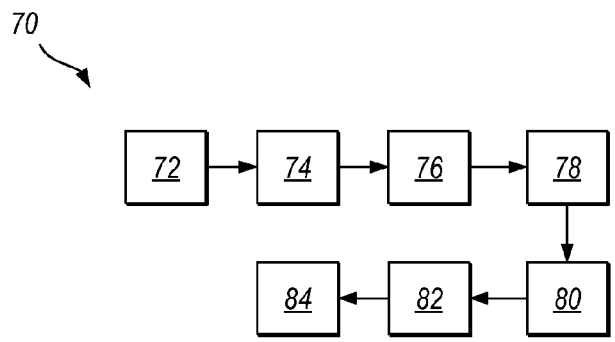
FIG. 2 is a schematic flow diagram of a method of determining available operating states within an electric powertrain.
Figure 3:
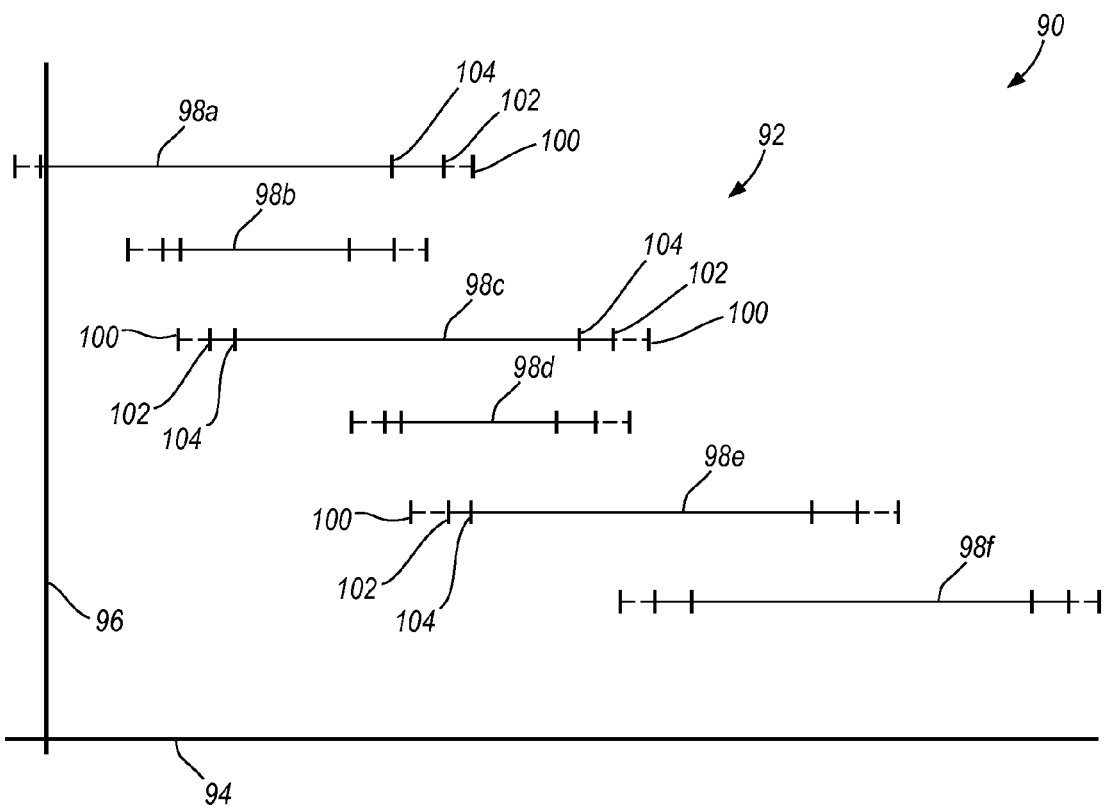
FIG. 3 is a schematic plot of a plurality of operating state speed ranges.

FIG. 2 illustrates a method 70 of determining available operating states within an electric powertrain. The method 70 may be performed, for example, by the SMM 58 via the available state identifier 66. The method 70 may be embodied as a software routine that may ultimately be executed by the controller 50. The method may begin at 72 by identifying all of the operating states that may exist within the electric powertrain. FIG. 3 schematically illustrates a plot 90 of a plurality of such operating states 92, with the horizontal axis 94 representing a state parameter (e.g., speed, torque, or temperature), and the vertical axis 96 merely being used to spread the states out for clarity. For clarity, FIG. 3 only illustrates a 1-parameter range for each state, however, in practice, the present method may be expanded to an unlimited parameter (n-parameter) situation.

In the interest of clearly describing the present method 70, the states 92 in FIG. 3 will be analogized to sequential gears, however, in practice, and as described above, the states may, in fact, represent discrete states of a significantly more complex system. Using the gear analogy, FIG. 3 then illustrates six discrete gears (i.e., states 98a-98f), that may be ordered along the vertical axis 96 of the plot 90, with the gear having the highest gear ratio (e.g., gear 1) shown as 98a, and the gear having the lowest gear ratio (e.g., gear 6) shown as 98f. Additionally, in this analogy, the horizontal axis 94 may represent a final output speed. As may be understood, gears in a typical transmission are generally sequential, meaning that they are used in an ordered manner. Said another way, to transition from gear/state 98a to 98c, it is common to use/transition through an intermediate gear/state 98b. Such an ordered arrangement may occur, for example, if gears 98a and 98c share common hardware that must be reconfigured prior to engaging the new state.

For each of the plurality of operating states 90, an actual hardware limit 100 is indicated in phantom, and the hardware limits 102 imposed by the speed request limiter 62 are indicated inside of the actual hardware limits 100. Additionally, "real" limits 104 may be imposed by the system inside of the limiter limits 102. These "real" limits 104 may be used to force state transitions prior to the system being limited in a fail-safe manner. Said another way, the speed request limiter 62 is a limiter of last-resort. The real limits 104 may represent a desired extreme operating condition within a state, and are inside of the hardware limiter limits 102 by a given safety factor.

Figure 4:
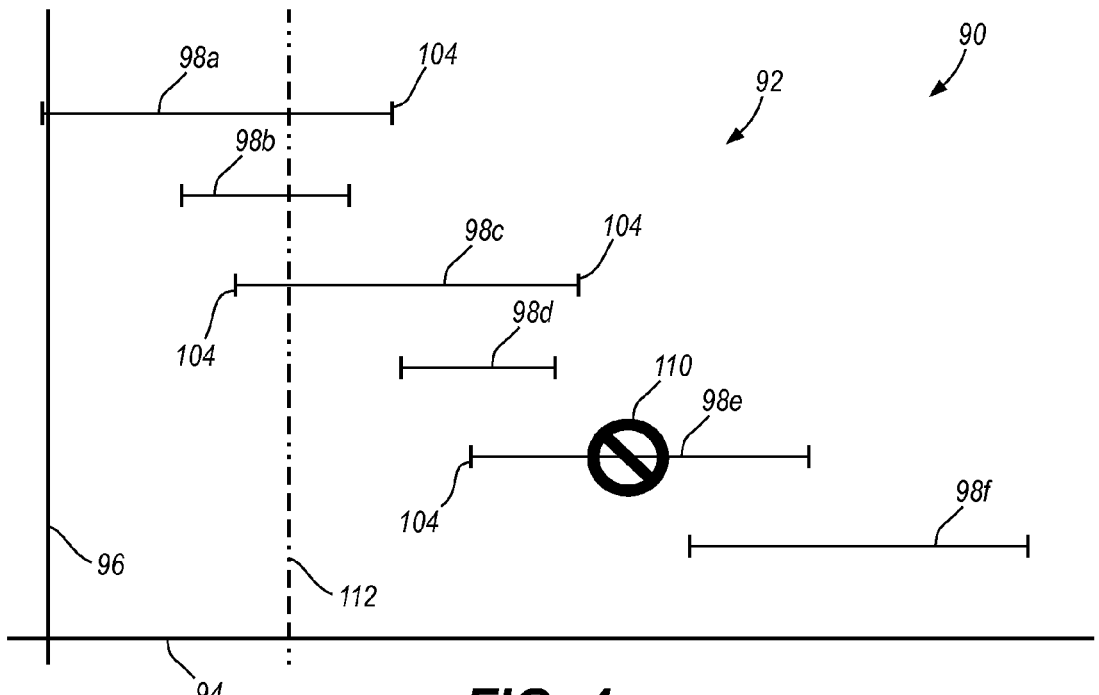
FIG. 4 is a schematic plot of a plurality of operating state speed ranges with a fault detected on one operating state.

Referring again to FIG. 2, once all of the operating states are identified in step 72, the controller 50 may then poll the various states in step 74 to determine if a fault exists in any state that may physically render that state unavailable. In one embodiment, the controller 50 may perform the fault detection in step 74 through direct communication with diagnostic sensors associated with each respective state. In another embodiment, the controller 50 may perform the fault detection in step 74 in an inferential manner by comparing certain known or expected behavior with actual current or past behavior of the system. FIG. 4 generally illustrates the gear system of FIG. 3, where a fault 110 has been detected on gear 5 (state 98e) that may render gear 6 (state 98f) inoperable or physically unavailable.

Referring again to FIG. 2, one fault detection has occurred in step 74, the controller 50 may then determine if the fault prevents other states from physically being available in step 76. For example, as shown in FIG. 4, where the vertical line 112 represents the current vehicle speed 94, the fault 110 may prevent a future shift into gear 6 (state 98f). Said another way, because the gears are ordered, it may be impossible or impractical to shift directly from gear 4 (state 98d) into gear 6 (state 98f) without the use of gear 5 (state 98e). This ordered nature, together with the fault on gear 5 (state 98e), may render it impossible to eventually up-shift into gear 6 (state 98f), given the current speed 112 below gear 5 (state 98e).

Referring again to FIG. 2, once the list of all states (determined in step 72) has been reduced to eliminate both the faulty states (in step 74) and fault-prevented states (in step 76), the controller may then determine (in step 78) which of the remaining states are "real allowed," given the current operating conditions of the vehicle and/or systems of interest. As used herein, a state is "real allowed" if the current operating parameters are within the established real limits 104 of that state. For example, FIG. 5 generally illustrates the plot of FIG. 4, with actual hardware limits 100 and hardware limiter limits 102 removed for clarity (leaving only the real limits 104). In this plot, given the current operating speed 112, gears 1, 2, and 3 (states 98a, 98b, and 98c) are "real allowed," while gear 4 (state 98d) is not.

Figure 5:
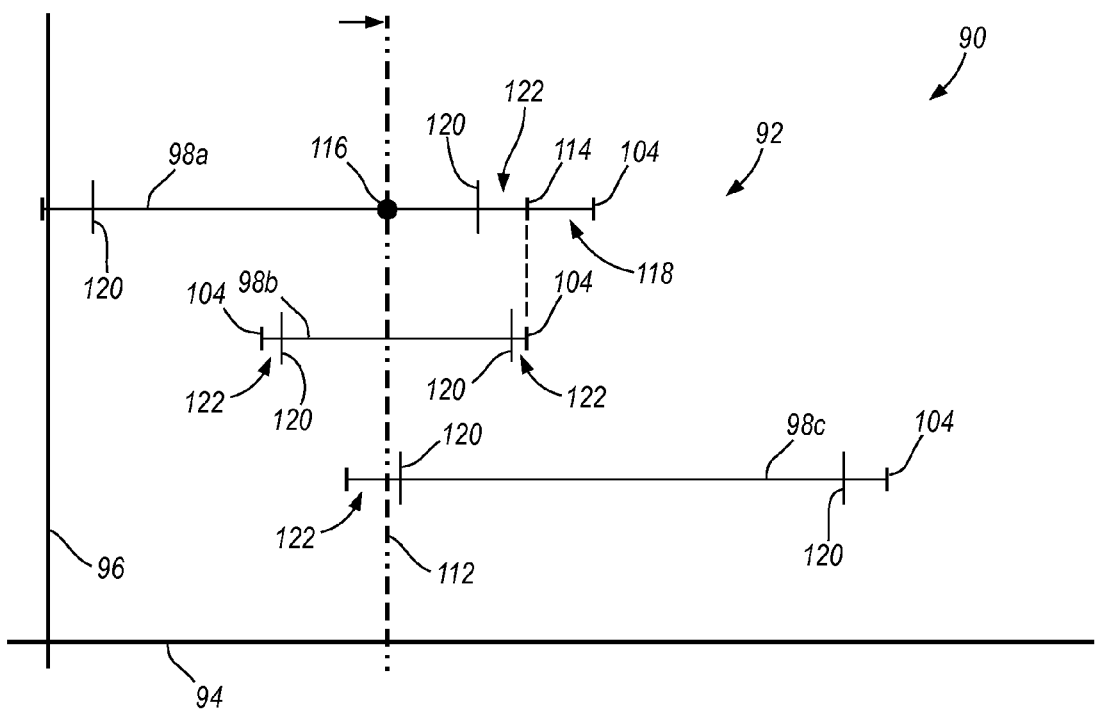
FIG. 5 is a schematic plot of a plurality of operating state speed ranges.

Once it has been determined which states are "real allowed" in step 78, any real limits for adjacent states may be mapped onto a current active state in step 80 (see FIG. 2). FIG. 5 illustrates a "mapped" real shift limit 114 on gear 1 (state 98a) that corresponds to the upper limit of gear 2 (state 98b). Note that FIG. 5 is a zoomed in view of gears 1-3 from FIG. 4. The mapping of real limits in step 80 may be necessary when an intermediate operating state is required, though may have a real operating range that does not extend to the real limit of the current operating state.

For example, as generally illustrated in FIG. 5, the vehicle may be operating in gear 1 (state 98a) at point 116. During an acceleration, the controller 50 may wish to upshift from gear 1 to gear 3 (state 98c), though may be required to transition through gear 2 (state 98b) or risk shifting to neutral. This situation may exist, for example, if gears/states 1 and 3 require the same hardware, with gear 2 being separated to allow the hardware of gears 1/3 to time to transition (e.g. as with a dual clutch transmission). If the system remains in gear 1 past the mapped, real shift limit 114 (i.e., into range 118), then gear 2 (state 98b) will no longer be "real allowed," and the shift may be restricted. Therefore, the real shift limit 114 may become the new upper real limit of gear 1 (state 98a).

While the preceding description provides a method of determining which operating states are actually allowed in an electric powertrain, as described, it does not account for any lag that may be inherent transitioning from one state to another, nor does it account for other desired performance characteristics that may be considered during the shift optimization. In this manner, in step 82 (FIG. 2) the controller 50 may impose various "ideal" shift limits 120 that may be separated from the real limits 104 or the real shift limits 114 by a margin 122, as generally illustrated in FIG. 5.

The margin 122 that separates an ideal shift limit 120 from a real limit 104 or real shift limit 114 may be either be a fixed value or may be a function of one or more operating parameters (e.g. speed, torque, acceleration, etc). In either case, the ideal shift limit 120 may be set such that given the rate of change of the parameter, along with the time required to effectuate a state transition, a real limit 104 may not be violated during the transition. For example, as shown in FIG. 5, if the speed 112 is accelerating and the controller 50 causes a shift right at the real shift limit 114, then the time required to shift, the acceleration, and the proximity to the real limit 104 of gear 2 (state 98*b*) may likely cause the real limit to be exceeded.

In one embodiment, the ideal shift limit 120 may solely be an anticipatory/predictive limit, which may be used to account for shift times and acceleration/deceleration of the monitored parameters. In another embodiment, other factors may be accounted for, such as, but not limited to, shift synchronization, powertrain jerk, power-handling capacity, powertrain efficiency, battery charging/discharging capacity, battery state-of-charge, and/or temperature.

Figure 6:
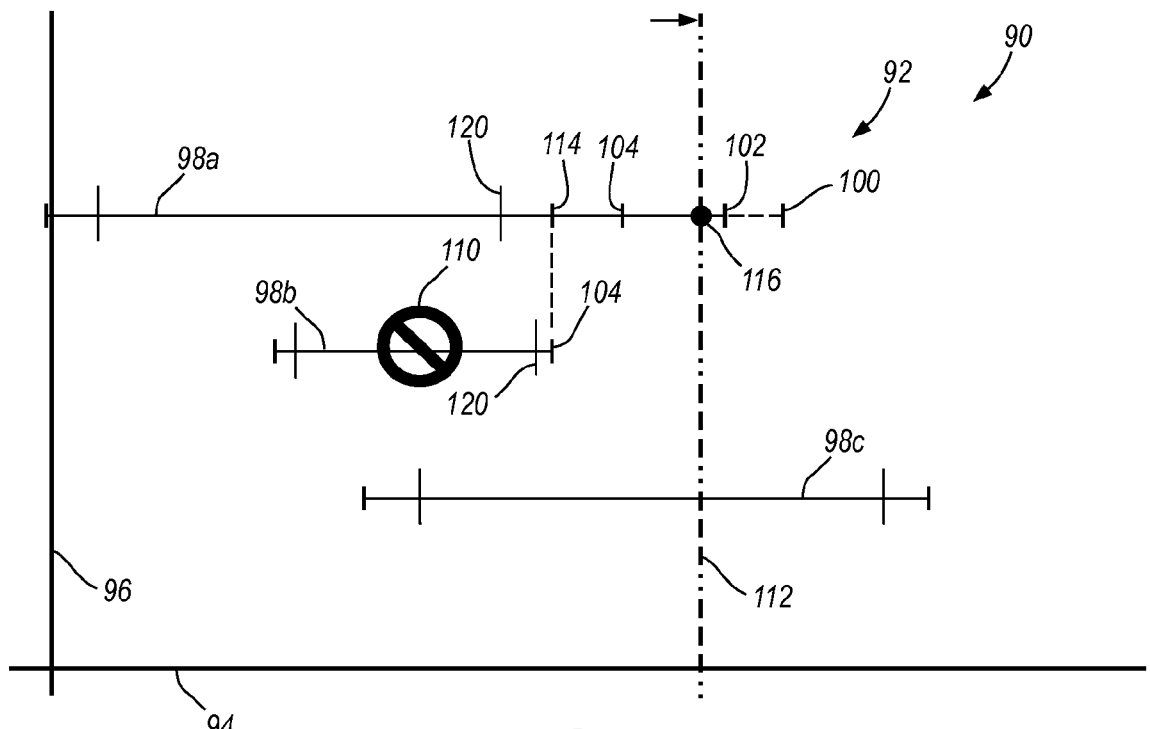
FIG. 6 is a schematic plot of a plurality of operating state speed ranges with an intermediate state unavailable.

If no subsequent operating state exists (e.g., a fault 110 occurs on gear 2 (state 98*b*), such as shown in FIG. 6), then, in step 84, the controller 50 may override the ideal shift limit 120, the real shift limit 114, and/or the real limit 104 within the current operating state, to provide a marginal increase in operating range before the speed request limiter 62 intervenes to limit the speed/torque at 102.

Figure 7:
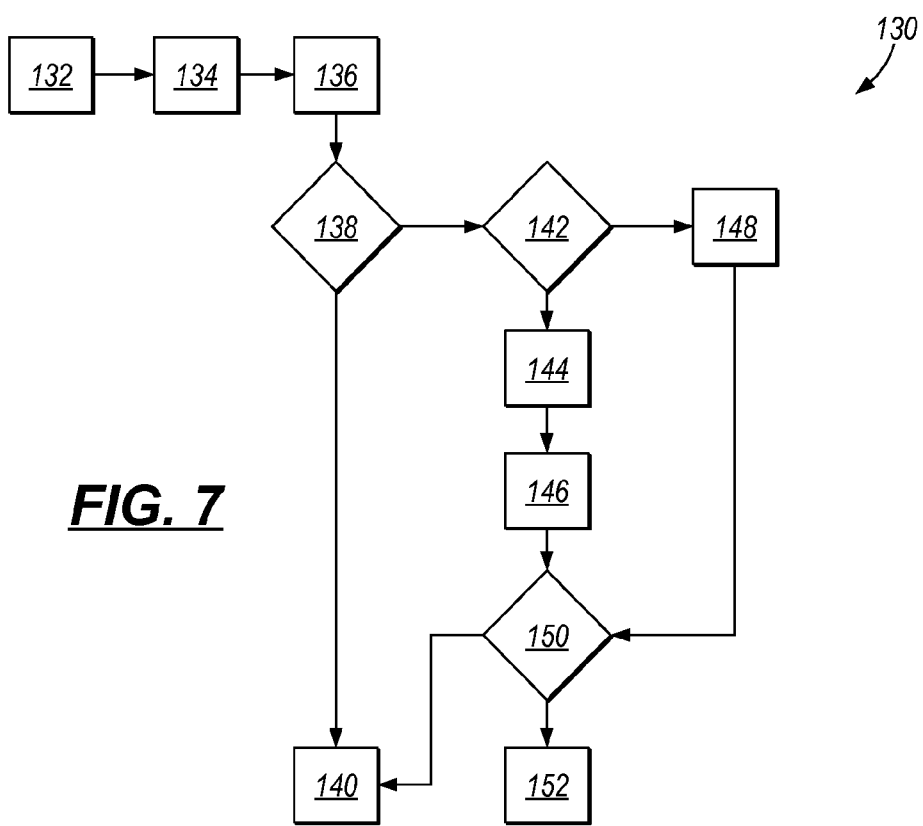
FIG. 7 is a schematic flow diagram of a method of determining available operating states within an electric powertrain.

FIG. 7 illustrates a method 130 that is similar to that provided in FIG. 2. The method 130 begins at step 132 by identifying all operating states. The method 130 proceeds to step 134 where the controller 50 may calculate (or look up from a stored lookup table) the individual hardware limiter limits 102 for each state, as well as the state's real limits 104 in step 136. This process may loop until the values have been found for each of the states.

In step 138, the controller 50 may determine if a particular state is real allowed. If not, the method 130 may draw the conclusion at 140 that that state is also not ideal allowed. If, however, the controller 50 determines that the state is real allowed at 138, it may then inquire at 142 whether there is a state that can be shifted into that is also real allowed. If so, adjacent real shift limits may be mapped into the current state in step 144, and ideal limits may be applied on top of the real shift limits in step 146. If no state can be shifted into that is real allowed at 142, then the controller 50 may override any applied ideal or real limits on that particular operating state at 148. In step 150, the controller may then determine wither the current operating parameters are within the ideal limits that may be required for a successful or ideal shift into the adjacent state. If the limits are satisfied, the adjacent state may be considered ideal allowed at 152. Otherwise, the controller 50 may draw the conclusion that the state is not ideal allowed at 140. This process may loop for all adjacent states and/or combinations of states. Finally, any states that are considered "ideal allowed" may then be passed to the optimization routine 64, where the best state may be selected, commanded to occur via the ECM 52, HCM 54, and TCM 56, where it may be used to implement the torque request from the user.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A method of managing available operating states in an electrified powertrain comprising:
   identifying a plurality of operating states of the electrified powertrain, each operating state representing a distinct physical configuration of the electrified powertrain, and wherein the electrified powertrain is configured to rotatably drive a vehicle wheel at a rotational output speed;
   determining, via a processor in communication with the electrified powertrain, an allowable hardware operating speed range for each of the plurality of operating states, the allowable hardware operating speed range being defined by a first hardware limit and a second hardware limit;
   determining a real operating speed range for each of the plurality of operating states, the real operating speed range being a subset of the allowable hardware operating speed range, and being defined by a first real limit that is greater than the first hardware limit, and by a second real limit that is less than the second hardware limit;
   determining an ideal operating speed range for each of the plurality of operating states, the ideal operating speed range being a subset of an allowable real operating speed range, and being defined by a first ideal limit that is greater than the first real limit, and by a second ideal limit that is less than the second real limit;
   indicating an operating state of the plurality of operating states as ideal-allowed if an actual output speed of the electrified powertrain is within the ideal operating speed range for that operating state; and
   commanding, via the processor, the electrified powertrain to operate within one of the operating states that is indicated as ideal-allowed.

2. The method of claim 1, wherein the electrified powertrain includes an electric motor, a transmission, and an internal combustion engine, wherein the electric motor and the internal combustion engine are coupled with an input shaft of the transmission, and wherein the vehicle wheel is coupled with an output shaft of the transmission, and wherein the electric motor and internal combustion engine cooperate to drive the wheel, via the transmission, at the rotational output speed;
   wherein the electrified powertrain further includes an engine control module configured to control operation of the internal combustion engine, a hybrid control module configured to control operation of the electric motor, and a transmission control module configured to control operation of the transmission; and
   wherein commanding the electrified powertrain to operate within one of the operating states that is indicated as ideal-allowed includes providing a request to at least one of the engine control module, the hybrid control module, and the transmission control module.

3. The method of claim 1, preventing the electrified powertrain from operating in any of the respective operating states if the rotational output speed is outside of the determined hardware operating speed range for that operating state.

4. The method of claim 1, further comprising creating a real shift limit within a first operating state of the plurality of operating states, the real shift limit corresponding to the second real limit of a second operating state of the plurality of operating states.

5. The method of claim 4, wherein the real shift limit is between the first real limit and the second real limit of the first operating state, and wherein the real shift limit is at the same rotational output speed as the second real limit of the second operating state.

6. The method of claim 5, wherein the second ideal limit in the first operating state is less than the real shift limit within the first operating state.

7. The method of claim 1, further comprising detecting a fault in at least one operating state of the plurality of operating states; and removing the at least one faulted operating state from the plurality of identified operating states.

8. A method of managing available operating states in an electrified powertrain comprising:
- identifying a first plurality of operating states that are capable of being achieved by the electric powertrain;
- identifying a first operating state of the first plurality of operating states that is being used to drive a vehicle wheel at an output speed;
- determining a fault in a second operating state of the first plurality of operating states, the fault preventing the second operating state from being available to drive the vehicle wheel;
- determining, via a processor, if the fault in the second operating state prevents a third operating state of the first plurality of operating states from being available to drive the vehicle wheel;
- identifying a second plurality of operating states that are available to drive the vehicle wheel;
- determining a third plurality of operating states from the second plurality of operating states, wherein the output speed of the vehicle wheel is within a first range of output speeds for each of the operating states in the third plurality of operating states;
- determining a fourth plurality of operating states from the third plurality of operating states, wherein the output speed of the vehicle wheel is within a second range of output speeds for each of the operating states in the fourth plurality of operating states;
- wherein the first range of output speeds is within an extreme hardware-limited operating range by a first margin for each operating state of the fourth plurality of operating states; and wherein the second range of output speeds is within the first range of output speeds by a second margin for each operating state of the fourth plurality of operating states; and
- transitioning, via the processor, the electrified powertrain from the first operating state to a fourth operating state selected from the fourth plurality of operating states if the fourth operating state is available.

9. The method of claim 8, wherein the output speed of the vehicle wheel is accelerating, and wherein the transitioning occurs prior to the output speed exceeding the second range of output speeds of the first operating state.

10. The method of claim 8, further comprising mapping a shift limit from the fourth operating state into the first operating state, the shift limit occurring at an output speed that is coincident with a boundary of the second range of output speeds for the fourth operating state.

11. The method of claim 8, further comprising extending the second range of the first operating state to a hardware limit if the fourth operating state is unavailable.

* * * * *